US011933313B2

(12) United States Patent
Will et al.

(10) Patent No.: US 11,933,313 B2
(45) Date of Patent: Mar. 19, 2024

(54) SEAL ARRANGEMENT FOR PUMP

(71) Applicant: Watson Marlow GmbH, Rommerskirchen (DE)

(72) Inventors: Sven-Eric Will, Ilsfeld (DE); Florian Walter, Ilsfeld (DE); Eric Mayer, Ilsfeld (DE)

(73) Assignee: Watson Marlow GmbH, Rommerskirchen (DE)

( * ) Notice: Subject to any disclaimer, the term of this patent is extended or adjusted under 35 U.S.C. 154(b) by 0 days.

(21) Appl. No.: 17/651,680

(22) Filed: Feb. 18, 2022

(65) Prior Publication Data
US 2022/0275806 A1 Sep. 1, 2022

(30) Foreign Application Priority Data

Feb. 26, 2021 (DE) .......................... 102021104723.4

(51) Int. Cl.
| | |
|---|---|
| *F04D 29/08* | (2006.01) |
| *F04D 3/00* | (2006.01) |
| *F04D 29/12* | (2006.01) |
| *F04D 29/18* | (2006.01) |
| *F04D 29/40* | (2006.01) |

(Continued)

(52) U.S. Cl.
CPC ............. *F04D 29/086* (2013.01); *F04D 3/00* (2013.01); *F04D 29/126* (2013.01); *F04D 29/18* (2013.01); *F04D 29/406* (2013.01); *F16J 15/021* (2013.01); *F16J 15/32* (2013.01); *F16J 15/34* (2013.01); *F16J 15/344* (2013.01); *F16J 15/3464* (2013.01); *F16J 15/38* (2013.01)

(58) Field of Classification Search
CPC ........ F04D 29/086; F16J 15/021; F16J 15/32; F16J 15/34; F16J 15/344; F16J 15/3464; F16J 15/38
See application file for complete search history.

(56) References Cited

U.S. PATENT DOCUMENTS 2,691,542 A * 10/1954 Chenoweth .......... F16J 15/3496
277/390
2,768,011 A * 10/1956 Mosher ................ F16J 15/3472
277/399

(Continued)

FOREIGN PATENT DOCUMENTS

DE 102015116769 A1 4/2017

OTHER PUBLICATIONS

German Examination Report, Application No. DE 10 2021 104 723.4, dated Nov. 15, 2021.

*Primary Examiner* — Courtney D Heinle
*Assistant Examiner* — Andrew J Marien
(74) *Attorney, Agent, or Firm* — Honigman LLP

(57) ABSTRACT

A pump comprises: at least one rotor rotatable about an axis of rotation; a pump housing surrounding the rotor, wherein a pump channel is formed between a radially inner surface of the pump housing and a radially outer surface of the rotor; and a seal assembly that seals the pump channel to an end surface of the rotor. The seal assembly comprises: a sliding surface which is provided on one of the rotor and the pump housing and which extends perpendicular to the axial direction of the rotor; a static surface provided on the other of the rotor and the pump housing; and a first elastomer element attached to the static surface and pressed against the sliding surface in the axial direction.

14 Claims, 2 Drawing Sheets

(51) Int. Cl.
*F16J 15/02* (2006.01)
*F16J 15/32* (2016.01)
*F16J 15/34* (2006.01)
*F16J 15/38* (2006.01)

(56) References Cited

U.S. PATENT DOCUMENTS

| | | | | |
|---|---|---|---|---|
| 3,979,104 | A * | 9/1976 | LaCoste | F16K 1/2268 |
| | | | | 277/389 |
| 5,183,270 | A * | 2/1993 | Alten | F16J 15/3452 |
| | | | | 277/405 |
| 2002/0020967 | A1 * | 2/2002 | Auber | F16J 15/3464 |
| | | | | 277/347 |
| 2012/0257985 | A1 * | 10/2012 | Parmeter | F04D 29/047 |
| | | | | 417/53 |
| 2015/0115538 | A1 * | 4/2015 | D'Orazio | F16J 15/3464 |
| | | | | 277/358 |
| 2017/0198813 | A1 * | 7/2017 | Itadani | F04D 29/406 |
| 2020/0040915 | A1 * | 2/2020 | Pohler | F04D 7/02 |
| 2020/0180584 | A1 * | 6/2020 | Gaertner | B60T 13/16 |

* cited by examiner

SEAL ARRANGEMENT FOR PUMP

CROSS-REFERENCE TO RELATED APPLICATIONS

This application claims priority of German Application No. DE102021104723.4 filed on Feb. 26, 2021, the contents of which are incorporated herein.

TECHNICAL FIELD

The present disclosure relates to a sealing arrangement for a pump having at least one rotor rotatable about an axis of rotation and including a rotor hub, and a pump housing surrounding the rotor, wherein a pump passage is formed between a radially inner surface of the pump housing and a radially outer surface of the rotor.

BACKGROUND

For pumps, and in particular for pumps used to convey liquid foodstuffs, mechanical seals are commonly used to seal a pump channel from other parts of the pump, such as from the shaft on which at least one rotor runs, or from a motor that drives the at least one rotor.

Known mechanical seals consist of a sliding surface made of ceramic and a static surface, which is usually made of ceramic or carbon and which is resiliently preloaded against the sliding surface. During operation of a pump, the mechanical seal is exposed to vibrations, so that the function of the seal can be impaired. In addition, mechanical seals must be accurately aligned during assembly, which can make pump maintenance and cleaning difficult.

In contrast, it is an object of the present disclosure to provide an improved seal for pumps which achieves a reliable sealing effect and which can be easily maintained, cleaned and replaced.

SUMMARY

A pump is provided for solving this problem, comprising at least one rotor rotatable about an axis of rotation, a pump housing surrounding the rotor, a pump channel being formed between a radially inner surface of the pump housing and a radially outer surface of the rotor, and a sealing arrangement sealing the pump channel at an end surface of the rotor. The end surface of the rotor may be a surface that is perpendicular to the axial direction of the rotor. The sealing arrangement includes a sliding surface provided on one of the rotor and the pump housing, which extends perpendicular to the axial direction of the rotor; a support surface provided on the other of the rotor and the pump housing; and a first elastomer element attached to the static surface and pressed against the sliding surface in the axial direction. The deformable elastomer element can at least partially compensate for vibrations and deformations of the rotor or the pump housing during operation of the pump. Thus, a constant contact between the sliding surface and the elastomer element can be ensured, so that the claimed pump with this sealing arrangement achieves a reliable sealing of the pump channel with respect to other components of the pump, such as a drive motor or the like.

For the function of the sealing arrangement, it is irrelevant whether the sliding surface is mounted on the rotor and the support surface with the elastomer element is mounted on the pump housing, or whether the sliding surface is mounted on the pump housing and the support surface with the elastomer element is mounted on the rotor.

According to some embodiments, the sliding surface may be formed of a ceramic material, such as silicon carbide, SiC, sintered silicon carbide, SSiC, or tungsten carbide, TC. This can ensure high strength and a low coefficient of friction of the sliding surface. It is of course also possible to manufacture the sliding surface from any ceramic material.

Thus, in contrast to known mechanical seals in which a ceramic sliding surface is usually pressed against a static surface which is also made of ceramic or, for example, of a carbon material, and in which the static surface is resiliently biased, in the sealing arrangement according to the present disclosure a ceramic sliding surface is in contact with an elastomer element which is pressed against the sliding surface in the axial direction.

According to some embodiments, the sealing arrangement may further comprise a sealing sleeve provided in the pump housing, wherein a surface of the sealing sleeve forms the support surface. Such a sealing sleeve can be retrofitted, for example, in pumps that were originally designed with other sealing systems. Furthermore, such a sealing sleeve can be easily removed and replaced in each case during maintenance and cleaning of the pump.

The sealing sleeve can be a metal sleeve that is supported on the pump housing in the axial direction by a second elastomer element. Such elastic support of the sealing sleeve on the pump housing allows the sealing arrangement to continue to work reliably even in the event of strong vibrations of the pump, since both elastomer elements can each elastically compensate for relative movements between the pump housing and the rotor through their elastic deformation.

According to some embodiments, the sealing sleeve may be movable in the axial direction relative to the pump housing, and the second elastomer element may be provided between the pump housing and a contact surface of the sealing sleeve extending perpendicular to the axial direction. This allows the sealing sleeve to perform compensating movements relative to the pump housing in the axial direction during operation of the pump, while the two elastomer elements elastically support the sealing sleeve in the radial direction between the sliding surface and the pump housing.

To achieve a high degree of tightness in the sealing arrangement, both elastomer elements can be compressed in the axial direction.

According to some embodiments, the sealing sleeve may comprise at least one anti-rotation device to prevent rotation of the sealing sleeve relative to the pump housing. Such an anti-rotation device can be realized, for example, by pins or projections on the sealing sleeve, which engage in corresponding recesses in the pump housing, or vice versa. This can simplify the assembly and alignment of the sealing sleeve in the pump housing.

According to some embodiments, the sealing sleeve comprises a cylindrical base body and a collar extending radially outwardly from the base body, the sealing sleeve being supported on the pump housing via the collar.

One surface of the collar can be the support surface that receives the elastomer element, so that the two elastomer elements are received on surfaces of the collar that are opposite in the axial direction and the sealing sleeve is thus supported by the collar in the axial direction between the pump housing and the sliding surface. Alternatively, a cylindrical sealing sleeve can also be provided, which receives the first and second elastomer elements on its axial end surfaces.

According to some embodiments, the rotor may have a receiving groove in which a sliding element is replaceably mounted, the sliding element comprising the sliding surface. In the event of wear or contamination of the sliding surface, the sliding element can thus be replaced.

The sliding element can comprise a holder by means of which it can be attached to the rotor, and a sliding body whose surface lying on the outside in the axial direction forms the sliding surface. The sliding body may be made entirely of a ceramic material, or it may comprise a ceramic sliding surface mounted on a base body made of another material.

This retainer can be designed as a retainer sleeve with an L-shaped cross-section and made of an elastomer material or PTFE. By means of the retaining collar, the sliding surface can be pressed into a groove in the rotor and it can be ensured that the transition from the rotor to the sliding surface is sealed.

According to another aspect, the present disclosure also provides a sealing module comprising first and second elastomer elements; a sealing sleeve having respective receptacles for the first and second elastomer elements, the receptacles being formed in surfaces of the sealing sleeve which face each other in the axial direction, and a sliding surface which is superimposed on the first elastomer element and which is mountable on a rotor which rotates relative to the sealing sleeve. Such a sealing module can be retrofitted, for example, into existing pumps or other existing machinery to provide improved sealing of the pump channel. In each case, the sliding surface can be mounted to a rotor or other rotating element, and the sealing sleeve with the two elastomer elements can be inserted into a pump housing or attached to another static component. Alternatively, a reverse arrangement can be provided, whereby the sliding surface is mounted in a static component, such as a pump housing, and the sealing sleeve with the elastomer elements can be attached to a rotor.

In this case, the sealing sleeve can comprise a cylindrical base body and a collar pointing radially outwards from the base body, the receptacles for the elastomer elements being formed in opposite surfaces of the collar. Particularly when retrofitting existing pumps, suitable dimensioning of the collar can easily produce a sealing sleeve which fits into existing pump housings and which can be supported on a suitable surface of the pump housing in the axial direction via the second elastomer element.

According to a further aspect, the present disclosure also provides a rotor module comprising a rotor to which a sliding surface extending perpendicular to the axial direction is attached, a first and a second elastomer element; a sealing sleeve having respective receptacles for the first and the second elastomer element, wherein the receptacles are formed in surfaces of the sealing sleeve which are opposite to each other in the axial direction, and wherein the first elastomer element abuts the sliding surface of the rotor. Such a rotor module can, for example, be retrofitted in existing pumps, whereby only the sealing sleeve has to be adapted accordingly in order to achieve a reliable sealing of the pump channel as a replacement for an existing sealing system.

In this case, the rotor can have a receiving groove in which a sliding body is replaceably mounted via a retaining sleeve with an L-shaped cross section, the sliding body comprising the sliding surface. This allows the sliding surface of the rotor to be removed and installed quickly and easily for cleaning or maintenance.

In the following, individual exemplary embodiments are described with reference to the accompanying drawings.

DETAILED DESCRIPTION

Figure 1:
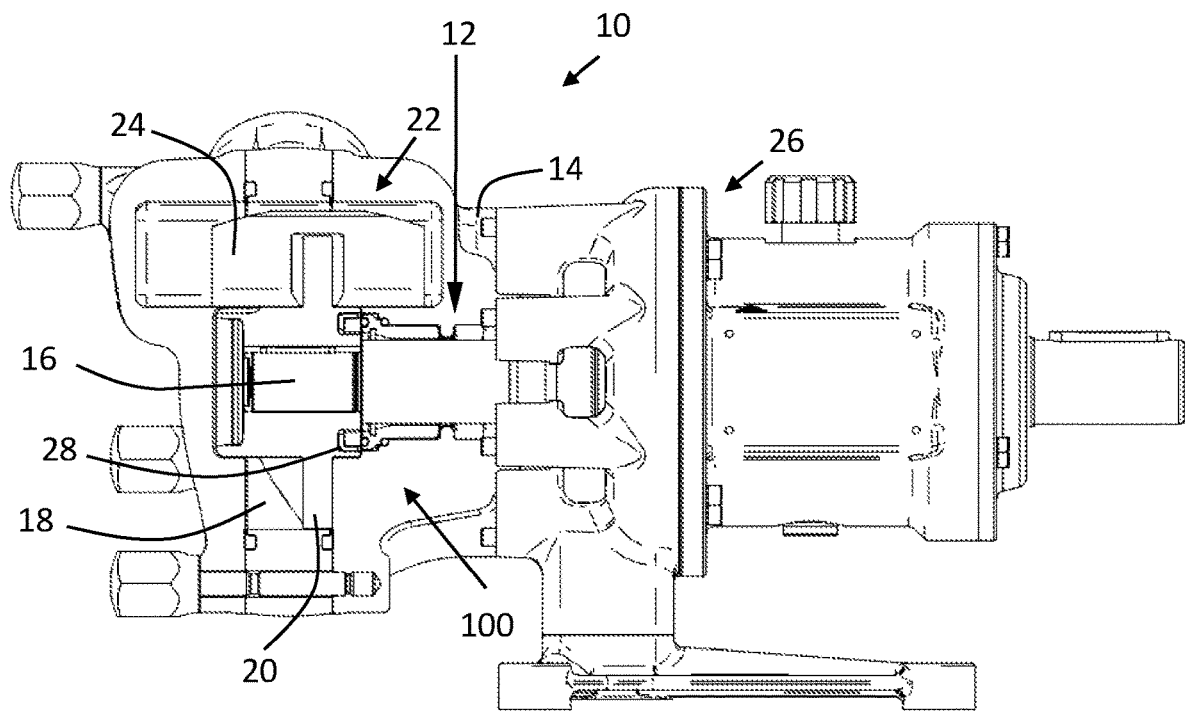
FIG. 1 shows a sectional view of a pump in which a sealing arrangement is provided according to one embodiment.

As shown in FIG. 1, a pump 10 has a rotor 12 and a pump housing 14. The rotor 12 is rotatably supported about a shaft 16, and a pump passage 18 is formed between the rotor 12 and the pump housing 14 in which a fluid to be pumped is conveyed. In the following description, the terms "axial direction" and "radial direction" refer to the axial and radial directions of the shaft 16 and the rotor 12, respectively.

In the pump 10 shown, the rotor 12 has a rotor collar 20 extending in a radial direction, which runs in a wave shape and by means of which the fluid is conveyed in the pump channel 18. A blocking device 22 with a blocking slide 24, which is placed on the rotor collar 20, prevents fluid to be pumped from flowing against the pumping direction.

On the side of the pump housing 14 facing away from the rotor 12, a drive unit 26 is provided with a motor which drives the rotor 12. On an end surface of the rotor 12 extending substantially perpendicular to the axial direction, a sealing arrangement 100 is provided to seal the pump channel 18 with respect to the pump housing 14 and the drive unit 26.

The pump 10 shown is merely an example of a pump in which the sealing arrangement 100 according to the disclosure can be used. The sealing arrangement 100 is not limited to the pump type shown in FIG. 1, but can in principle be used in all pump designs that have one or more rotors that are to be sealed off from a pump housing.

Figure 2:
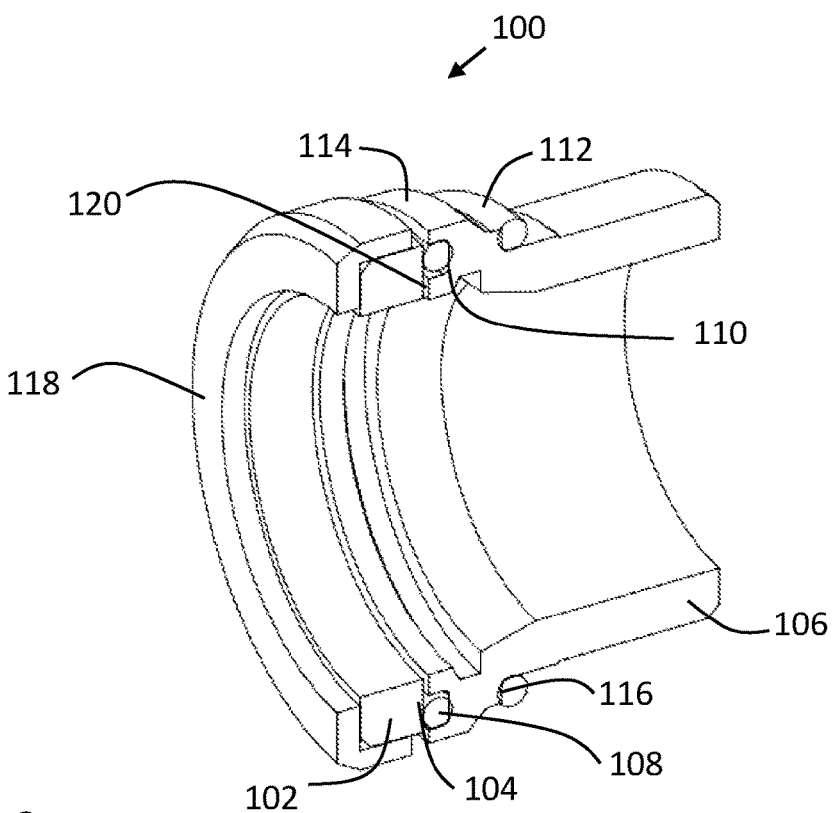
FIG. 2 shows a view of the sealing arrangement shown in FIG. 1.

As shown in FIG. 2, the sealing arrangement 100 comprises a sliding body 102 having a sliding surface or dynamic surface 104 extending perpendicular to the axial direction, the sliding body 102 being received in a receiving groove 28 of the rotor 12, as shown in FIG. 1. At least the sliding surface 104, or even the complete sliding body 102, are thereby made of a ceramic material, such as silicon carbide, SiC, sintered silicon carbide, SSiC or tungsten carbide, TC. Here, any ceramic material with suitable friction and abrasion properties can be used.

A sealing sleeve 106 is attached to the pump housing 14, as also shown in FIG. 1, which has a first elastomer element 108 that can be received, for example, in a groove 110 in the sealing sleeve 106. In the embodiment shown, the sealing sleeve 106 is thereby supported on the pump housing 14 by a second elastomer element 112.

In this case, the surface 120 of the sealing sleeve 106 facing the sliding surface 104 of the rotor 12 forms a static surface 120 of the sealing arrangement 100.

For example, the elastomer elements 108, 112 may each be an O-ring or quad ring. In this case, the first elastomer element 108 is thereby in contact with the sliding surface 104 and is thereby substantially annular to achieve a reliable sealing effect. In the embodiment shown, both elastomer elements 108, 112 are designed as O-rings.

However, the second elastomer element 112, via which the sealing sleeve 106 is supported on the pump housing 14, does not necessarily have to be formed as a ring, but may, for example, comprise a plurality of individual elastomer elements, each of which supports a specific section of the sealing sleeve 106 on the pump housing 14 in such a way that the first elastomer element 108 is pressed against the sliding surface 104 in the axial direction.

The sealing sleeve 106 shown in FIG. 2 has a collar 114 that extends radially outward from a cylindrical base body of the sealing sleeve 106, and that provides a shoulder surface 116 against which the second elastomer element 112 abuts in the axial direction.

Alternatively, however, a hollow cylindrical sealing sleeve without a collar is also possible, for example, in which the two elastomer elements 108, 112 are provided on the two end faces of the hollow cylinder, or the shape of the sealing sleeve can be adapted to the shape of a pump housing that is to be retrofitted with a sealing arrangement by means of appropriate projections or support surfaces.

Figure 3:
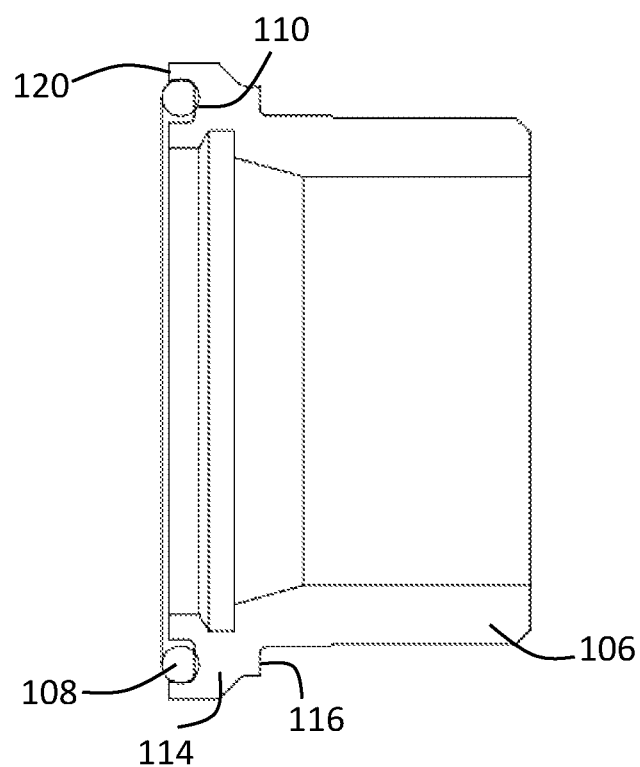
FIG. 3 shows a section through a sealing sleeve of the sealing arrangement shown in FIG. 1.

The sealing sleeve 106 shown in FIGS. 2 and 3 has no anti-rotation feature, but is held in position by the static friction between the shoulder surface 116 of the sealing sleeve 106 and the second elastomer element 112, or by the static friction between the second elastomer element 112 and the pump housing 14. However, it is also possible to provide an anti-rotation device in the form of pins or projections on the sealing sleeve 106 which then engage in corresponding recesses in the pump housing 14. With such an anti-rotation device, however, it should be noted that the sealing sleeve 106, even if it is prevented from rotating relative to the pump housing 14, continues to remain movable in the axial direction relative to the pump housing 14 so that elastic compression of the two elastomer elements 108, 112 in the axial direction can be achieved.

The sealing sleeve 106 of the illustrated embodiment is made of metal. However, sealing sleeves made of other materials, such as plastic or ceramic materials, can also be used in the sealing arrangement 100 according to the disclosure.

As shown in FIG. 3, the groove 110 in the sealing sleeve 106 is sized such that the first elastomer element 108 projects axially beyond an end face of the sealing sleeve 106 in the uncompressed state.

FIG. 2 further shows a sliding body 102 that can be pressed into a corresponding groove of the rotor 12 by means of a retaining collar 118. The sliding body 102 and the retaining collar 118 together form a sliding element.

In this regard, the retaining collar 118 may have an L-shaped cross-section and at least partially surround the sliding body 102 radially outwardly and on the axial end face facing away from the sliding surface 104. Depending on the shape of the rotor 12, the retaining collar 118 may be varied to achieve ease of assembly and tight and reliable retention of the sliding body 102.

In the present embodiment, the retaining sleeve 118 is made of an elastomer material or PTFE. This allows the sliding element 102 to be pressed into the rotor 12 in such a way that a high degree of tightness can also be achieved on the rotor side of the sealing arrangement 100, and the sliding element is thus securely and tightly mounted in the receiving groove 28 of the rotor.

During operation of the pump 10, the two elastomer elements 108, 112 of the sealing arrangement are at least partially elastically deformed so that the first elastomer element 108 is pressed in the axial direction against the rotating sliding surface 104 of the rotor 12. In the process, the sealing arrangement 100 is lubricated by the fluid that is conveyed in the pump channel 18. Fluid entering the pump housing 14 past the first elastomer element 108 is thereby prevented by the second elastomer element 112 from advancing further in the pump housing 14, so that a good seal of the pump channel 18 with respect to the motor and the pump housing 14 of the pump 10 is achieved by the sealing arrangement 100.

The fact that vibrations during operation of the pump 10 can be compensated for by elastic deformation of the two elastomer elements 108, 112 means that the pump channel can be reliably sealed at an operating pressure of up to 15 bar. The components used can thereby be made of materials which are approved for use in food processing and which are stable at usual operating temperatures, for example up to 100° C.

When cleaning or servicing the pump 10, the rotor 12 with the sliding element attached thereto is removed from the shaft 16. The sliding element can then be separated from the rotor 12 by removing the retaining collar 118 from its retaining groove in the rotor 12.

The sealing sleeve 106 and the two elastomer elements 108, 112 can be easily removed from the pump housing 14 after removal of the rotor 12 and are therefore easily accessible for cleaning or replacement without the need for special tools. This allows even an unskilled assistant to service and clean the pump 10 according to the embodiment described above.

In the embodiment shown, the sliding surface 104 is attached to the rotor 12, and the first elastomer element 108 in contact with the sliding surface 104 is attached to the pump housing 14 via the sealing sleeve 106. However, in other embodiments not shown, the first elastomer element may instead be attached to the rotor and the sliding surface in axial contact with the first elastomer element may be attached to the pump housing. Again, the sliding surface may be made of a suitable ceramic material, and the elastomer element may be, for example, an O-ring or a quad ring.

In summary, the present disclosure thus describes a pump 10 and a sealing arrangement 100 with a high degree of tightness so that, in particular when pumping food, it can be ensured that the fluid to be pumped is not contaminated by lubricants or the like. Furthermore, by using elastomer elements 108, 112, the described sealing arrangement 100 is stable even when the pump 10 vibrates, is easy to retrofit into existing pumps, and can be maintained and replaced without tools.

The sliding surface 104 of the sealing arrangement 100 attached to the rotor 12 is thereby pressed in the axial direction against the elastomer surface of the first elastomer element 108 and lubricated by the fluid to be pumped during operation of the pump 10. As a result, abrasion on the sliding surface 104 and on the elastomer element 108 can be minimized.

The invention claimed is:

1. A pump comprising:
    at least one rotor rotatable about an axis of rotation,
    a pump housing surrounding the rotor, wherein a pump channel is formed between a radially inner surface of the pump housing and a radially outer surface of the rotor, and
    a seal assembly sealing the pump channel to an end surface of the rotor, the seal assembly comprising:
    a sliding body having a sliding surface, the sliding, body is an annular member provided on one of the rotor and the pump housing and which extends perpendicular to an axial direction of the rotor, the sliding surface is formed of a ceramic material, the ceramic material being one of a silicon carbide, SiC, sintered silicon carbide, SSiC, and tungsten carbide, TC;
a sealing sleeve having a static surface provided on the other of the rotor and the pump housing; and
a first elastomer element attached to the static surface and pressed against the sliding surface in the axial direction.

2. The pump of claim 1, wherein the sealing sleeve is provided in the pump housing.

3. The pump of claim 2, wherein the sealing sleeve is a metal sleeve that is axially supported on the pump housing via a second elastomer element.

4. The pump of claim 3, wherein the sealing sleeve is movable in an axial direction relative to the pump housing, and wherein the second elastomer element is provided between the pump housing and an abutment surface of the sealing sleeve extending perpendicular to the axial direction.

5. The pump of claim 3, wherein both the first and the second elastomer elements are compressed in the axial direction.

6. The pump of claim 2, wherein the sealing sleeve comprises a cylindrical base body and a collar extending radially outwardly from the base body, the sealing sleeve being supported on the pump housing via the collar, the sliding body disposed between the collar and the sealing sleeve.

7. The pump of claim 6, wherein a surface of the collar is the static surface that receives the first elastomer element.

8. The pump of claim 1, wherein the rotor includes a receiving groove in which a sliding member is replaceably mounted, the sliding member comprising the sliding surface.

9. The pump according to claim 8, wherein the sliding element comprises a retaining collar, by means of which it can be fixed in the receiving groove of the rotor, and a sliding body, the outer surface of which in an axial direction forms the sliding surface.

10. A sealing module comprising:
a first elastomer element and a second elastomer element;
a sealing sleeve having respective receptacles for the first and second elastomer elements, the receptacles being formed on surfaces of the sealing sleeve that face each other in an axial direction, and
a sliding body having a sliding surface, the sliding body being an annular member, wherein the sliding surface is superimposed on the first elastomer element and which is mountable on a rotor that rotates relative to the sealing sleeve, the sliding surface is formed of a ceramic material, the ceramic material being one of the following: silicon carbide, SiC, sintered silicon carbide, SSiC, and tungsten carbide, TC.

11. The sealing module of claim 10, wherein the sealing sleeve comprises a cylindrical base body and a collar extending radially outwardly from the base body, the receptacles for the elastomer elements being formed in opposing surfaces of the collar.

12. Rotor module comprising:
a rotor to which a sliding surface having sliding surface extending perpendicular to an axial direction of the rotor is attached, the sliding body is an annular member and the sliding surface is formed of a ceramic material, the ceramic material being one of the following: silicon carbide, SiC, sintered silicon carbide, SSiC, and tungsten carbide, TC,
a first elastomer element and a second elastomer element;
a sealing sleeve having respective receptacles for the first and second elastomer elements, the receptacles being formed in surfaces of the sealing sleeve that face each other in the axial direction, and
wherein the first elastomer element abuts the sliding surface of the rotor.

13. The rotor module of claim 12, wherein the rotor includes a receiving groove in which a sliding body is replaceably mounted via a retaining collar having an L-shaped cross-section, the sliding body comprising the sliding surface.

14. A pump comprising:
at least one rotor rotatable about an axis of rotation,
a pump housing surrounding the rotor, wherein a pump channel is formed between a radially inner surface of the pump housing and a radially outer surface of the rotor, and
a seal assembly sealing the pump channel to an end surface of the rotor, the seal assembly comprising:
a sliding body having a sliding surface, the sliding body being an annular member that is provided on the rotor and which extends perpendicular to an axial direction of the rotor, the sliding surface is formed of a ceramic material, the ceramic material being one of a silicon carbide, SiC, sintered silicon carbide, SSiC, and tungsten carbide, TC;
a sealing sleeve provided in the pump housing, wherein a surface of the sealing sleeve defines a static surface, the sealing sleeve includes a cylindrical base body and a collar extending radially outwardly from the base body, the sealing sleeve being supported on the pump housing via the collar, wherein a surface of the collar is the static surface; and
a first elastomer element attached to the static surface and pressed against the sliding surface in the axial direction.

* * * * *